(No Model.)
W. H. TUTTLE.
POTATO DIGGER.
No. 349,961. Patented Sept. 28, 1886.
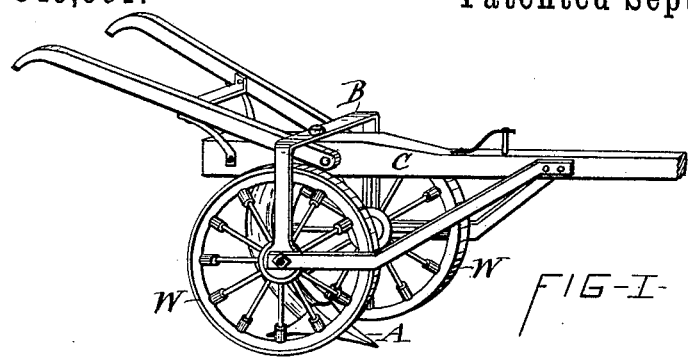
FIG-I-
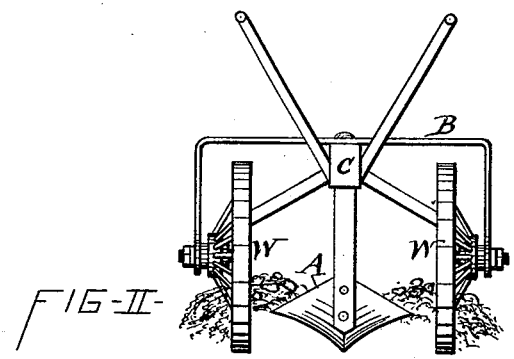
FIG-II-
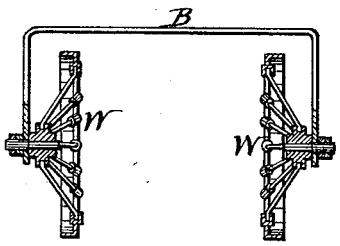
FIG-III-
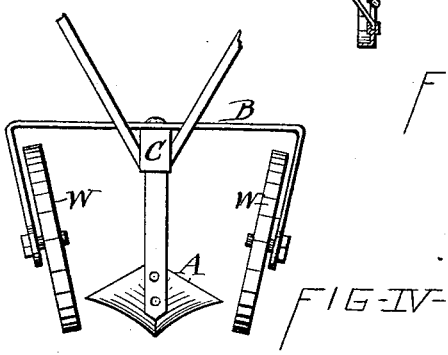
FIG-IV-
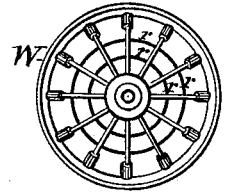
FIG-V-
WITNESSES
C. Bendixon
Wm. B. Raymond
INVENTOR
Willis H. Tuttle
per Knill, Laass & Hey
his Attys

UNITED STATES PATENT OFFICE.

WILLIS H. TUTTLE, OF CANANDAIGUA, NEW YORK.

POTATO-DIGGER.

SPECIFICATION forming part of Letters Patent No. 349,961, dated September 28, 1886.

Application filed November 10, 1884. Serial No. 147,470. (No model.)

*To all whom it may concern:*

Be it known that I, WILLIS H. TUTTLE, of Canandaigua, in the county of Ontario, in the State of New York, have invented new and useful Improvements in Potato-Diggers, of which the following, taken in connection with the accompanying drawings, is a full, clear, and exact description.

This invention relates to the class of potato-diggers which have combined carrying and riddling wheels arranged at opposite sides of the plow or digger for the purpose of riddling the soil cast aside by the digger and separating the potatoes from said soil and casting the potatoes upon the surface.

My invention consists in connecting to the riddling-wheels chains or rods extending from spoke to spoke, as hereinafter fully described, and specifically set forth in the claim. Said attachment greatly increases the efficiency of the riddling-wheels.

In the annexed drawings, Figure I is a perspective view of a potato-digger with riddling-wheels as ordinarily constructed. Fig. II is a rear end view of the same. Fig. III is a vertical transverse section showing the connection of the riddling-wheels with their supporting arch or yoke. Fig. IV is a rear end view illustrating a modification in the disposition of the riddling-wheels; and Fig. V is a side view of my improved riddling-wheel.

Similar letters of reference indicate corresponding parts.

A represents the digger, which may be either in the form of a shovel-plow, as shown, or of any other suitable and well-known form adapted to raise and turn over the soil containing the potatoes to be dug. Transversely over said digger I place an arch or yoke, B, which is to be properly secured to the plow-beam C, or to the frame of the machine, according to the style of the digger and its support.

To the inner side of the feet of the aforesaid arch are pivoted the carrying-wheels W W, which are thus arranged at opposite sides of the digger A and in position to intercept the substances cast aside or laterally from the digger. Said wheels are made to serve the functions of riddles for separating the soil from the potatoes cast laterally from the digger as aforesaid. Such wheels have usually been formed with simply radial spokes, and the result was that the potatoes were allowed to roll from the spokes and drop back into the loosened soil, and thus become more or less covered therein. To obviate this defect I connect to the wheels W W chains or rods $r$ $r$, extended from spoke to spoke at proper distances between the tread and hub of the wheel, and forming a net-work which effectually guards against the escape of the potatoes through the plane of the wheel.

In the operation of my improved potato-digger, the digger proper, A, is drawn through the row of potato-plants, and is thus caused to cast up and turn over the soil with the potatoes contained therein. By means of drag-chains, usually connected to the rear of the digger, the potatoes are raised to the surface of that portion of the cast-up soil which falls over the top of the rear end of the digger. Such of the dug-up substances which are cast aside or laterally by the digger are intercepted by the wheels W W, which in their rotation riddle the said substances, the soil escaping through the spaces between the spokes and chains or rods $r$ $r$ of the wheels, and said chains or rods serve to throw the potatoes to the surface and toward the center of the row dug by the machine.

Having described my invention, what I claim as new, and desire to secure by Letters Patent, is—

In combination with the digger, the wheels W W, arranged at opposite sides of the digger, and the chains or rods $r$ $r$, extended from spoke to spoke of said wheels, substantially as shown and described.

In testimony whereof I have hereunto signed my name and affixed my seal, in the presence of two attesting witnesses, at Canandaigua, in the county of Ontario, in the State of New York, this 6th day of November, 1884.

WILLIS H. TUTTLE. [L. S.]

Witnesses:
   H. H. JONES,
   L. U. GRAVES.